Patented Dec. 3, 1935

2,023,389

UNITED STATES PATENT OFFICE 2,023,389

CASEIN SOLUTION

Carl Iddings, Staten Island, N. Y., assignor to The Muralo Company, Inc., a corporation of New York No Drawing. Application December 8, 1933, Serial No. 701,572

33 Claims. (Cl. 134—50)

This invention relates to stable casein solutions and the process of manufacturing the same.

An object of the present invention is the production of such a casein solution which is smooth in appearance, has good flowing properties and is stable with respect to its initial viscosity for relatively long periods of time.

Another object of the present invention is the manufacture of a casein solution which is useful in various industrial processes, such as the manufacture of water paste paints, water-oil emulsions, glues, sizes, insecticides, etc. My improved casein solution is also especially suitable for the preparation of coating compositions adapted to be applied to walls, floors, leather, paper, etc. It may also be used for the production of so-called water-emulsion paste paints and serve as a basic ingredient of printing inks.

A third object of my present invention is the production of a casein solution which will remain stable regardless of whether this solution is subsequently rendered slightly acidic or slightly alkaline and which simultaneously retains its useful properties for relatively long periods of time.

A fourth object of this invention is the preparation of a casein solution of heavy body yet at the same time having good flowing properties.

A fifth object of the present invention is the manufacture of an almost neutral casein solution without employing alkalis during its production, thus effecting savings in costs and simplifying operations.

The basic idea of the present invention is to produce a casein solution by peptizing and/or dissolving casein at elevated temperatures by means of soluble fluorides in the presence of finely divided silica and a regulated quantity of water. When the process is carried out in this manner, the casein seems to melt or dissolve to produce a very smooth viscous solution and it does not appear to swell through a curdy stage. Depending upon the ratios of the ingredients used, the finished casein solution has a low or high viscosity and its reaction may be either slightly basic or acidic. The finished product may be diluted to some extent or rendered slightly alkaline without adversely changing or losing its valuable properties, the higher pH values being in general conducive to higher viscosities.

I have found by experimentation that soluble fluorides generally, may be used, although I prefer to use fluorides of the alkali metals and of ammonia. Sodium fluoride alone or in combination with ammonium fluoride is especially valuable for the aforementioned purpose. While I prefer to use these compounds for economic reasons, I do not intend to limit my invention to the use of these compounds, since any soluble fluoride may be employed which will produce soluble caseinates. Soluble fluorides, I have found, when used in accordance with my improved process, have the property of dissolving or peptizing casein, partially neutralizing the same and simultaneously of making the same resistant to hydrolysis and to attack by various microorganisms. It is to be noted that these agents alone, without requiring additional reagents, will bring about the production of stable casein solutions. Although I prefer to use sodium or ammonium fluorides or mixtures of these compounds in amounts varying from 5 to 20 parts per 100 parts of commercial, acid-precipitated casein, other ratios will produce satisfactory results.

The water to be added during the reaction may vary to a large extent, i. e., I may merely moisten the casein or add enough water to prepare directly a thin casein solution. I have found that the best results are obtained by using 125 to 500 parts of water per 100 parts of casein. These quantities of water produce pastes which are easy to heat and handle and yet will not become too thin. I wish to point out that my process is not limited to the exact amounts of water set forth above, since reasonable variations in water content will not adversely affect the final product.

I have, furthermore, found that the presence of silica in the reacting compounds permits the production of casein solutions at lower temperatures than heretofore possible. When the mixture is warmed, the grainy mass starts to become pasty at temperatures ranging from 120 to 160° F. depending upon the proportions of water and other ingredients used. As a rule, the smaller the amounts of water used the higher are the temperatures required to produce this pasty mass. Although satisfactory solutions of temporary value may be prepared at these low temperatures, I prefer to use temperatures ranging from 170° F. to 210° F., because such solutions possess not only the valuable gluelike properties desired but also good stability with respect to time. In particular, I have found that solutions prepared at temperatures ranging from 180° F. to 195° F. are characterized by smoothness, stability and good body. It is to be understood, however, that the temperatures may be varied between wide limits without deleteriously affecting the final product, and that this invention covers the range from 120° F. to 210° F.

F., and that the range from 170° F. to 210° F. is preferred only because of the longer life and greater stability of the solutions prepared within this range.

I have found by experimentation that any type of silica may be employed, provided it is present in reasonably active form. Crystalline silicas or ground quartz are not as effective as amorphous silica or diatomaceous earths and must be used in somewhat larger proportions to obtain equal results. Amorphous silicas or silicic acids prepared by the treatment of soluble silicates with strong acids may also be used as the form of silica for this process. It is to be understood, therefore, that this invention clearly covers any form of silica, silicic acid, or silicates, natural or otherwise, which bring about the desired results in my process.

I have found that the presence of silica in the reacting substances is essential and that almost neutral solutions of casein may be obtained in this manner upon heating. The following table depicts the effect of silica in the composition:

|  | Without silica | With silica |
| --- | --- | --- |
| Casein | 100 parts | 100 parts. |
| Sodium fluoride | 12 parts | 12 parts. |
| Ammonium fluoride | 4 parts | 4 parts. |
| Silica |  | 5 parts. |
| Water, initial amount | 125 parts | 125 parts. |
| Water for dilution | 275 parts | 275 parts. |
| pH of final solution | 6.3 | 6.9. |
| Appearance | Not smooth | Very smooth. |

It is to be noted that any type of acid-precipitated casein may be used in this process, such as muriatic, sulphuric and lactic caseins.

*Example*

To 100 parts of commercial acid-precipitated casein are added 150 parts of water, 14 parts of sodium fluoride, 5 parts of ammonium fluoride and 7 parts of pulverized silica. The mixture is stirred to homogeneity, and after standing long enough to thoroughly soak the casein particles, is heated to 195° F. under continuous, slow stirring and maintained at this temperature for periods of time varying from a few moments to several hours. During this treatment, the casein will change its appearance from a damp grainy meal to a smooth, stiff paste. The time of reaction selected depends upon the type of product desired, the longer the treatment the more viscous are the compositions obtained. I have found that for practical results times of cooking varying from ½ hour to 1 hour produce very satisfactory results. The casein appears to melt into a viscous condition and loses all of its grainy characteristics. The casein solution produced may be diluted, preferably while still warm. As an example of such dilution, after the mass has been changed from a coarsely granular mass to a smooth, stiff paste, 300 parts of water at 120° F. are added, whereupon the mixture will have a temperature somewhat below 195° F., say about 160° F., at which temperature the dilution can be completed under continuous stirring. This latter temperature is not of particular importance, although I prefer to dilute the mass while still warm since the casein becomes more viscous on cooling and difficult to thin to the degree desired. It is advisable to avoid too high temperatures, for example 210° F., since the continued application of such temperatures may cause darkening of the solution. The pH of the finished product which has employed a sulphuric acid-precipitated casein will be about 6.9–7.0. The solution, however, may be rendered alkaline by the addition of suitable modifying agents such as borax, ammonium hydroxide, sodium silicate, trisodium phosphate or piperazine, that is compounds which will produce soluble caseinates. After the solution has been completed, it is allowed to cool to room temperature.

I wish to emphasize that the solution and stabilization of the casein is brought about during the initial heating stage and not by subsequent dilution which is carried out merely for the purpose of adjusting the finished product to a proper consistency. I may also vary the characteristics of the casein solution by using fluorides in combination with other electrolytes. A combination of sodium fluoride with ammonium chloride gives very satisfactory results, although other compounds may be substituted for ammonium chloride. By increasing the proportions of sodium fluoride and silica, products may be made which are alkaline in reaction although no alkali was used in the process.

My invention is not restricted to the temperatures, percentages or other exemplary data given, except as governed by the appended claims.

I claim:

1. The process of producing a casein solution comprising reacting casein in the presence of heat, water, and a soluble fluoride selected from the group consisting of alkali metal fluorides and ammonium fluoride and finely divided silica and subsequently diluting the reaction product with water.

2. The process of producing a casein solution comprising reacting casein in the presence of heat, water, and a soluble fluoride selected from the group consisting of alkali metal fluorides and ammonium fluoride and amorphous silica and subsequently diluting the reaction product with water.

3. The process of producing a casein solution characterized by its stability and undiminished viscosity over long periods of time comprising heating casein in the presence of water, a soluble fluoride selected from the group consisting of alkali metal fluorides and ammonium fluoride and finely divided silica to temperatures of 170–210° F. and subsequently diluting the reaction product with water.

4. The process of producing a casein solution characterized by its stability and undiminished viscosity over long periods of time comprising heating casein in the presence of a soluble fluoride selected from the group consisting of alkali metal fluorides and ammonium fluoride and amorphous silica to temperatures of 170–210° F.

5. The process of producing a casein solution comprising reacting in the presence of heat about 100 parts of casein with about 125–500 parts of water, 5–30 parts each of a soluble fluoride selected from the group consisting of alkali metal fluorides and ammonium fluoride and silica.

6. The process of producing a casein solution characterized by its stability and undiminished viscosity over long periods of time comprising heating about 100 parts of casein with about 125 to 500 parts of water, 5 to 30 parts each of a soluble fluoride selected from the group consisting of alkali metal fluorides and ammonium fluoride and silica, to a temperature of 170–210° F.

7. The process of producing a casein solution comprising reacting casein and an alkali metal fluoride in the presence of heat, water, and finely divided silica and subsequently diluting the reaction product with water.

8. The process of producing a casein solution comprising reacting casein and ammonium fluoride in the presence of heat, water, and finely divided silica and subsequently diluting the reaction product with water.

9. The process of producing a casein solution characterized by its stability and undiminished viscosity over long periods of time comprising heating casein in the presence of water, an alkali metal fluoride and finely divided silica to temperatures of 180 to 195° F. and subsequently diluting the reaction product with water.

10. The process of producing a casein solution characterized by its stability and undiminished viscosity over long periods of time comprising heating casein in the presence of water, a soluble fluoride selected from the group consisting of alkali metal fluorides and ammonium fluoride and finely divided silica to temperatures of 180 to 195° F.

11. The process of producing a casein composition characterized by its stability and undiminished viscosity over long periods of time comprising reacting casein and a soluble fluoride selected from the group consisting of alkali metal fluorides and ammonium fluoride, finely divided amorphous silica and water at temperatures of 170 to 210° F.

12. The process of producing a casein composition characterized by its stability and undiminished viscosity over long periods of time comprising reacting casein and a soluble fluoride selected from the group consisting of alkali metal fluorides and ammonium fluoride, in the presence of heat, amorphous silica and water.

13. The process of producing a casein composition characterized by its stability and undiminished viscosity over long periods of time comprising reacting casein and a fluoride of an alkali metal, in the presence of heat, finely divided silica and water.

14. The process of producing a casein solution characterized by its stability and undiminished viscosity over long periods of time comprising reacting casein and ammonium fluoride, finely divided silica and water at temperatures of 170 to 210° F.

15. The process of producing a casein composition characterized by its stability and undiminished viscosity over long periods of time comprising heating casein in the presence of a soluble fluoride selected from the group consisting of alkali metal fluorides and ammonium fluoride, finely divided silica and water to temperatures of 170° to 210° F.

16. The process of producing a casein composition characterized by its stability and undiminished viscosity over long periods of time comprising reacting casein and a soluble fluoride selected from the group consisting of alkali metal fluorides and ammonium fluoride, finely divided silica, water and an alkaline pH-modifying agent at temperatures of 170 to 210° F.

17. The process of producing a casein solution characterized by its stability and undiminished viscosity over long periods of time comprising reacting casein and a soluble fluoride selected from the group consisting of alkali metal fluorides and ammonium fluoride, finely divided silica, ammonium chloride and water at temperatures of 180 to 195° F.

18. The process of producing a casein composition characterized by its stability and undiminished viscosity over long periods of time comprising heating casein in the presence of a soluble fluoride selected from the group consisting of alkali metal fluorides and ammonium fluoride, finely divided silica, an alkaline pH-modifying agent and water to temperatures of 170 to 210° F.

19. The process of producing a casein solution characterized by its stability and undiminished viscosity over long periods of time comprising heating casein in the presence of a soluble fluoride selected from the group consisting of alkali metal fluorides and ammonium fluoride, finely divided silica, ammonium chloride and water to temperatures of 170 to 210° F.

20. A casein composition characterized by its stability and undiminished viscosity over long periods of time comprising the heat-reaction products obtained at temperatures of 170 to 210° F. of casein, a soluble fluoride selected from the group consisting of alkali metal fluorides and ammonium fluoride, finely divided silica and water.

21. A new composition of matter comprising casein, a soluble fluoride selected from the group consisting of alkali metal fluorides and ammonium fluoride and finely divided silica reacted in the presence of water.

22. A new composition of matter comprising casein, a soluble fluoride selected from the group consisting of alkali metal fluorides and ammonium fluoride, and amorphous silica reacted in the presence of water.

23. A new composition of matter comprising casein, a combination of soluble fluorides selected from the group consisting of alkali metal fluorides and ammonium fluoride and finely divided silica reacted in the presence of water.

24. A new composition of matter comprising casein, a soluble fluoride selected from the group consisting of alkali metal fluorides and ammonium fluoride, finely divided silica and reacted in the presence of water an alkaline pH-modifying agent.

25. A new composition of matter comprising casein, an alkali metal fluoride and finely divided silica reacted in the presence of water.

26. A new composition of matter comprising casein, ammonium fluoride and finely divided silica reacted in the presence of water.

27. A new composition of matter comprising casein, sodium fluoride and finely divided silica reacted in the presence of water.

28. The process of producing a casein composition comprising heating casein in the presence of water, an alkali metal fluoride and finely divided silica at a temperature in the range 180 to 195° F.

29. The process of producing a casein composition comprising heating casein in the presence of water, an ammonium fluoride and finely divided silica at a temperature in the range 180 to 195° F.

30. The process of producing a casein composition comprising heating casein in the presence of water, an alkali metal fluoride, an ammonium fluoride and finely divided silica at a temperature in the range 170 to 210° F.

31. The process of producing a casein composition comprising heating casein in the presence of water, a soluble fluoride selected from the group consisting of alkali metal fluorides and ammonium fluoride and finely divided silica to a temperature in the range 120 to 210° F.

32. The method of controlling the resultant pH of a composition comprising casein, a soluble fluoride selected from the group consisting of alkali metal fluorides and ammonium fluoride and finely divided silica reacted in the presence of heat, comprising varying the quantity of silica present.

33. The method of controlling the resultant pH of a composition comprising casein, a soluble fluoride selected from the group consisting of alkali metal fluorides and ammonium fluoride and finely divided silica reacted in the presence of heat, comprising varying the quality of silica present.

CARL IDDINGS.

CERTIFICATE OF CORRECTION.

Patent No. 2,023,389. December 3, 1935.

CARL IDDINGS.

It is hereby certified that error appears in the printed specification of the above numbered patent requiring correction as follows: Page 2, second column, lines 29-30 and 36-37, claims 1 and 2 respectively, strike out the words and comma "in the presence of heat, water," and insert the same after "fluoride" in lines 32 and 39 respectively; page 3, second column, line 31, claim 22, strike out the comma after "fluoride"; line 42, claim 24, beginning with the word "an" strike out all to and including "agent" in line 43, and insert the same after "and" in line 41; strike out the period at the end of line 43 and insert the same after "water" in line 42; and that the said Letters Patent should be read with these corrections therein that the same may conform to the record of the case in the Patent Office.

Signed and sealed this 17th day of December, A. D. 1935.

Leslie Frazer
Acting Commissioner of Patents.

(Seal)

kali metal fluorides and ammonium fluoride and finely divided silica reacted in the presence of heat, comprising varying the quantity of silica present.

33. The method of controlling the resultant pH of a composition comprising casein, a soluble fluoride selected from the group consisting of alkali metal fluorides and ammonium fluoride and finely divided silica reacted in the presence of heat, comprising varying the quality of silica present.

CARL IDDINGS.

CERTIFICATE OF CORRECTION.

Patent No. 2,023,389. December 3, 1935.

CARL IDDINGS.

It is hereby certified that error appears in the printed specification of the above numbered patent requiring correction as follows: Page 2, second column, lines 29-30 and 36-37, claims 1 and 2 respectively, strike out the words and comma "in the presence of heat, water," and insert the same after "fluoride" in lines 32 and 39 respectively; page 3, second column, line 31, claim 22, strike out the comma after "fluoride"; line 42, claim 24, beginning with the word "an" strike out all to and including "agent" in line 43, and insert the same after "and" in line 41; strike out the period at the end of line 43 and insert the same after "water" in line 42; and that the said Letters Patent should be read with these corrections therein that the same may conform to the record of the case in the Patent Office.

Signed and sealed this 17th day of December, A. D. 1935.

Leslie Frazer
Acting Commissioner of Patents.

(Seal)